(12) United States Patent
Lewis

(10) Patent No.: US 8,242,790 B2
(45) Date of Patent: Aug. 14, 2012

(54) METHOD AND SYSTEM FOR DETECTION OF TAMPERING RELATED TO REVERSE ENGINEERING

(76) Inventor: James M. Lewis, Moulton, AL (US)

( * ) Notice: Subject to any disclaimer, the term of this patent is extended or adjusted under 35 U.S.C. 154(b) by 575 days.

(21) Appl. No.: 12/487,693

(22) Filed: Jun. 19, 2009

(65) Prior Publication Data

US 2010/0213951 A1 Aug. 26, 2010

Related U.S. Application Data

(60) Provisional application No. 61/154,540, filed on Feb. 23, 2009.

(51) Int. Cl.
*G01R 27/28* (2006.01)
(52) U.S. Cl. ......................... 324/649; 361/672
(58) Field of Classification Search ........................ None
See application file for complete search history.

(56) References Cited

U.S. PATENT DOCUMENTS

| | | | | |
|---|---|---|---|---|
| 5,471,194 | A * | 11/1995 | Guscott | 340/511 |
| 6,373,264 | B1 * | 4/2002 | Matsumoto et al. | 324/667 |
| 6,943,518 | B1 * | 9/2005 | Mooney | 318/490 |
| 7,328,115 | B2 * | 2/2008 | Shipton et al. | 702/106 |
| 2002/0036879 | A1 * | 3/2002 | Vacherand et al. | 361/93.1 |
| 2002/0166058 | A1 | 11/2002 | Fueki | |
| 2005/0151777 | A1 * | 7/2005 | Silverbrook | 347/19 |
| 2006/0126412 | A1 | 6/2006 | Maki | |
| 2006/0221686 | A1 * | 10/2006 | Devadas et al. | 365/185.03 |
| 2007/0069875 | A1 * | 3/2007 | Doi | 340/440 |
| 2007/0130452 | A1 | 6/2007 | Muir | |
| 2007/0255966 | A1 | 11/2007 | Condorelli et al. | |
| 2009/0010107 | A1 * | 1/2009 | Drude | 368/62 |

OTHER PUBLICATIONS

Bota, S.A. et al., "Smart Temperature Sensor for Thermal Testing of Cell-Based, ICs", Proceedings of the Design, Automation and Test in Europe Conference and Exhibition, 2005.
Kaxiras, Stefanos, "4T-Decay Sensors: A New Class of Small, Fast, Robust, and Low-Power, Temperature/Leakage Sensors", ISLPED'04, Aug. 8-11, 2004, Newport Bch., CA, pp. 108-113.
Lopez-Buedo, Sergio et al., Thermal Testing on Reconfigurable Computers, IEEE Design & Test of Computers, Jan.-Mar. 2000, pp. 94-91.

* cited by examiner

*Primary Examiner* — Roberto Velez
*Assistant Examiner* — Temilade S Rhodes-Vivour
(74) *Attorney, Agent, or Firm* — Welsh Flaxman & Gitter LLC

(57) ABSTRACT

A sensor system for protecting products and technology from reverse engineering by detecting attempts to probe electronic circuitry includes a sensor electrically linked to electronic circuitry. The sensor detects interaction of probe devices with the electronic circuitry for the purpose of reverse engineering the electronic circuitry. The sensor includes an exciter and an impedance counter linked to the exciter. A count rate of the impedance counter is a function of the impedance of the electronic circuitry due to the fact that oscillation frequency generated by the exciter is also a function of the impedance of the electronic circuitry. The sensor also includes an impedance register storing the binary count value from the impedance counter, wherein after the impedance counter data is transferred into the impedance register, the data is referred to as impedance data. The sensor also includes a reference oscillator monitoring count rate of the impedance counter and a sensor evaluation system comparing the impedance value to threshold values to determine if a significant change has occurred. When changes have occurred this is indicative of abnormal behavior and may be indicative of tampering relating to the evaluation of the electronic circuit for the purpose of reverse engineering.

28 Claims, 14 Drawing Sheets

Basic Ring Oscillator and resulting Resonant Systems

Figure 1, Basic Ring Oscillator and resulting Resonant Systems

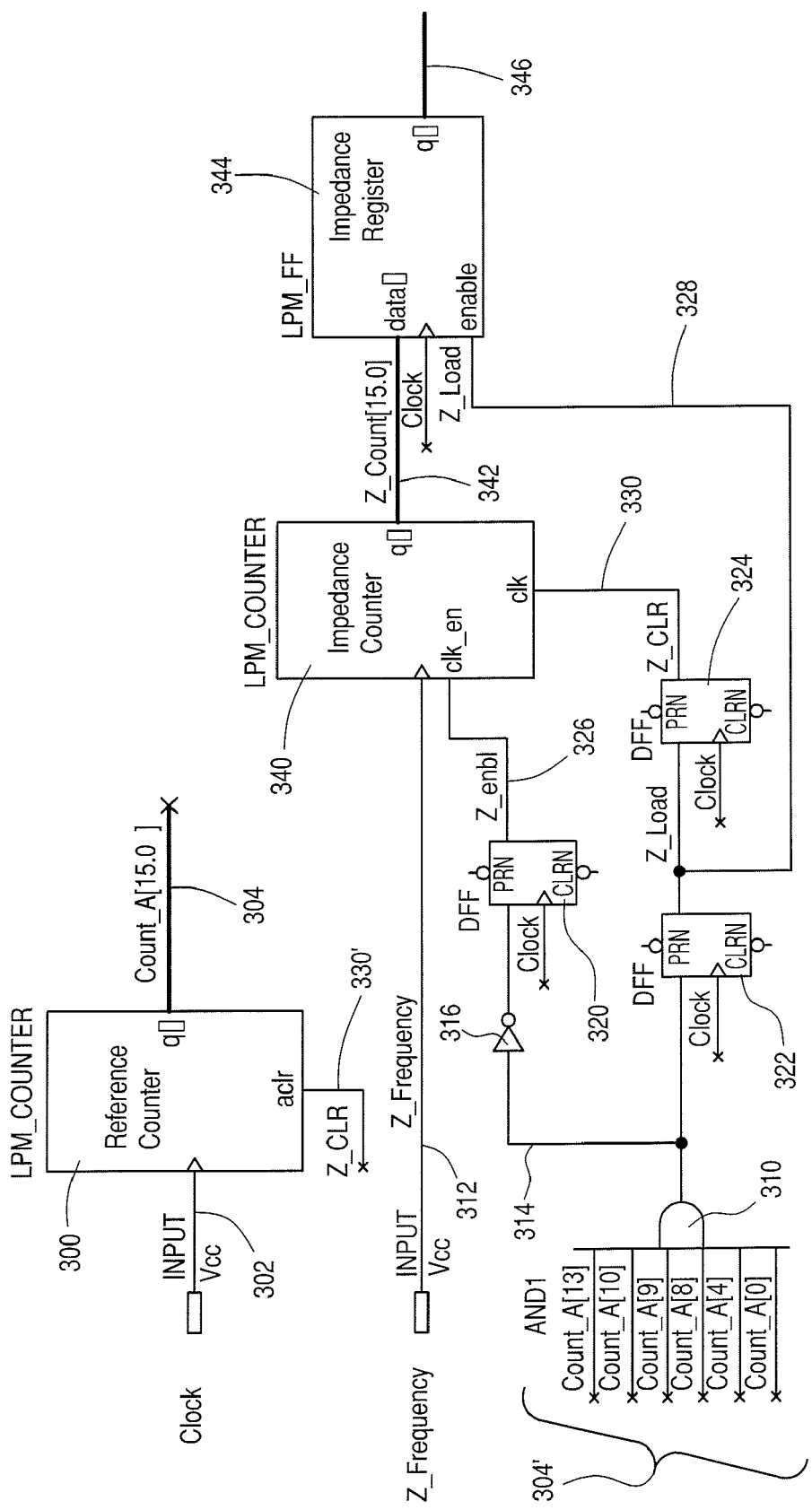
Figure 4, Reference Counter and Impedance Counter Components

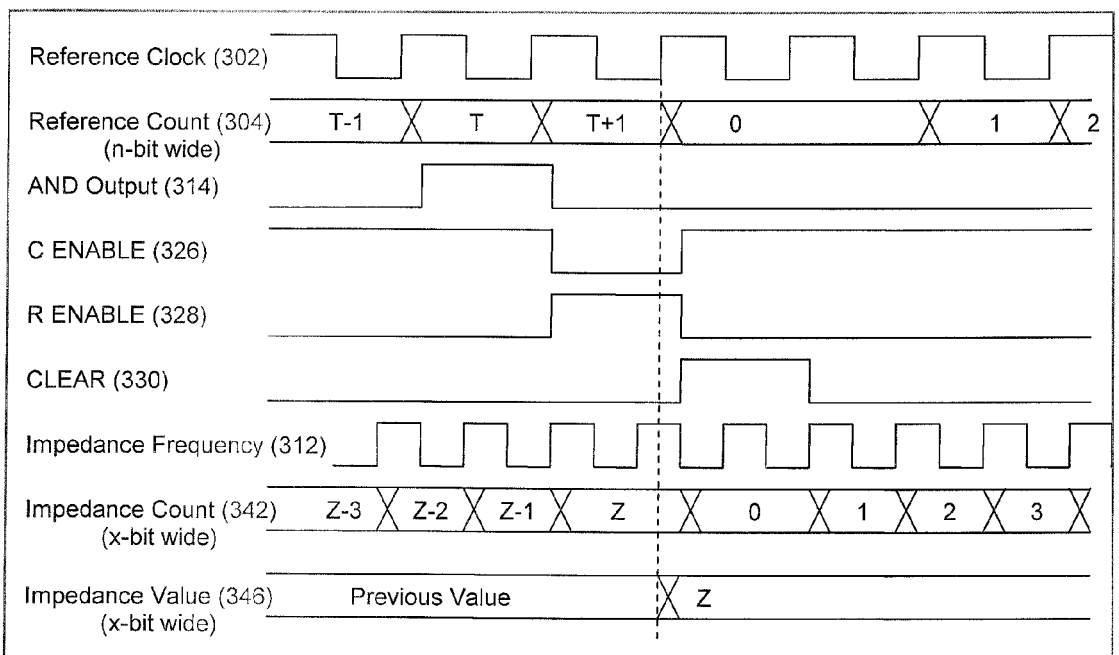
Figure 5, Reference Counter and Impedance Counter Timing Diagram

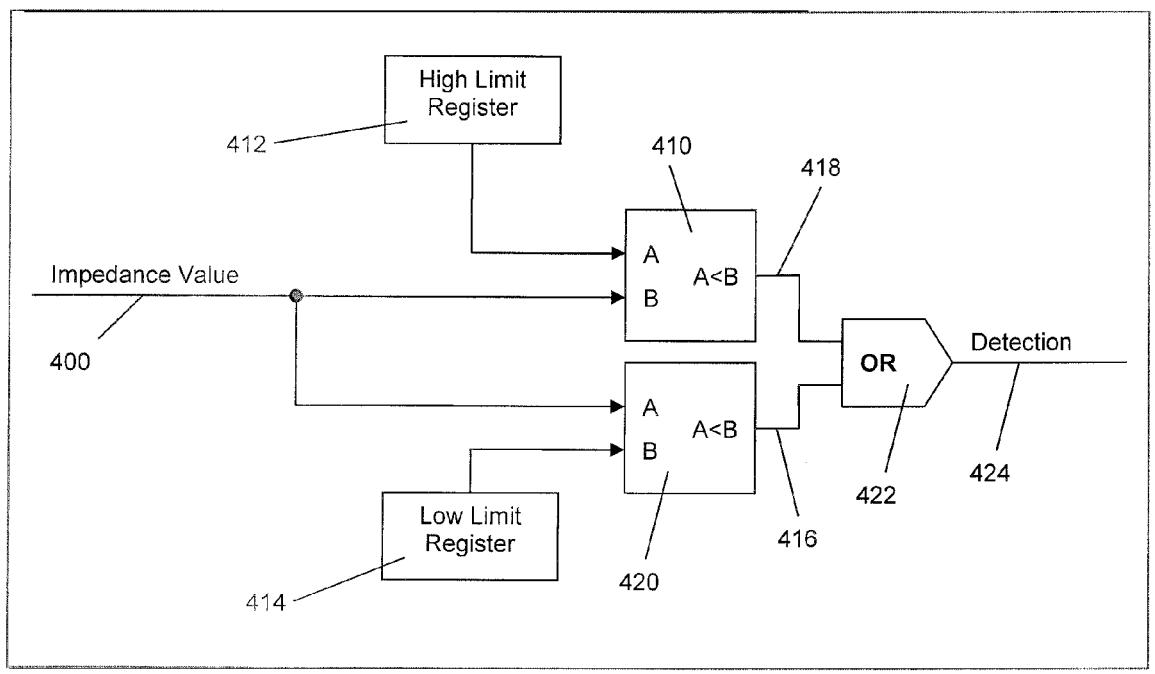
Figure 6, Sensor Evaluation System

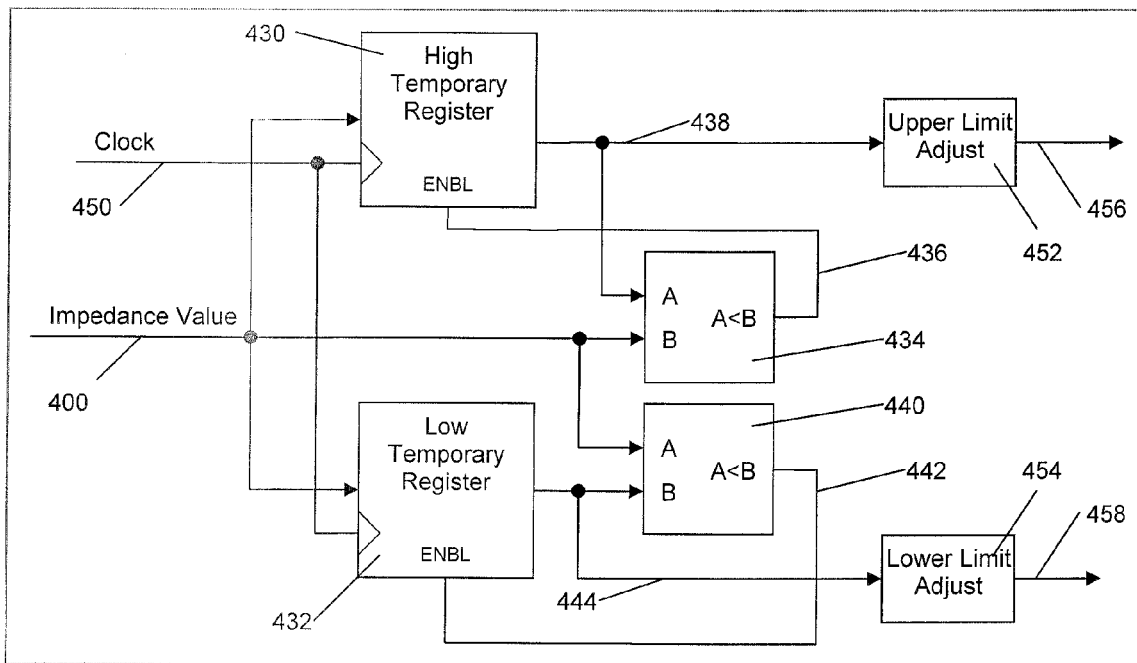
Figure 7, Determination of Threshold Limits Dynamically

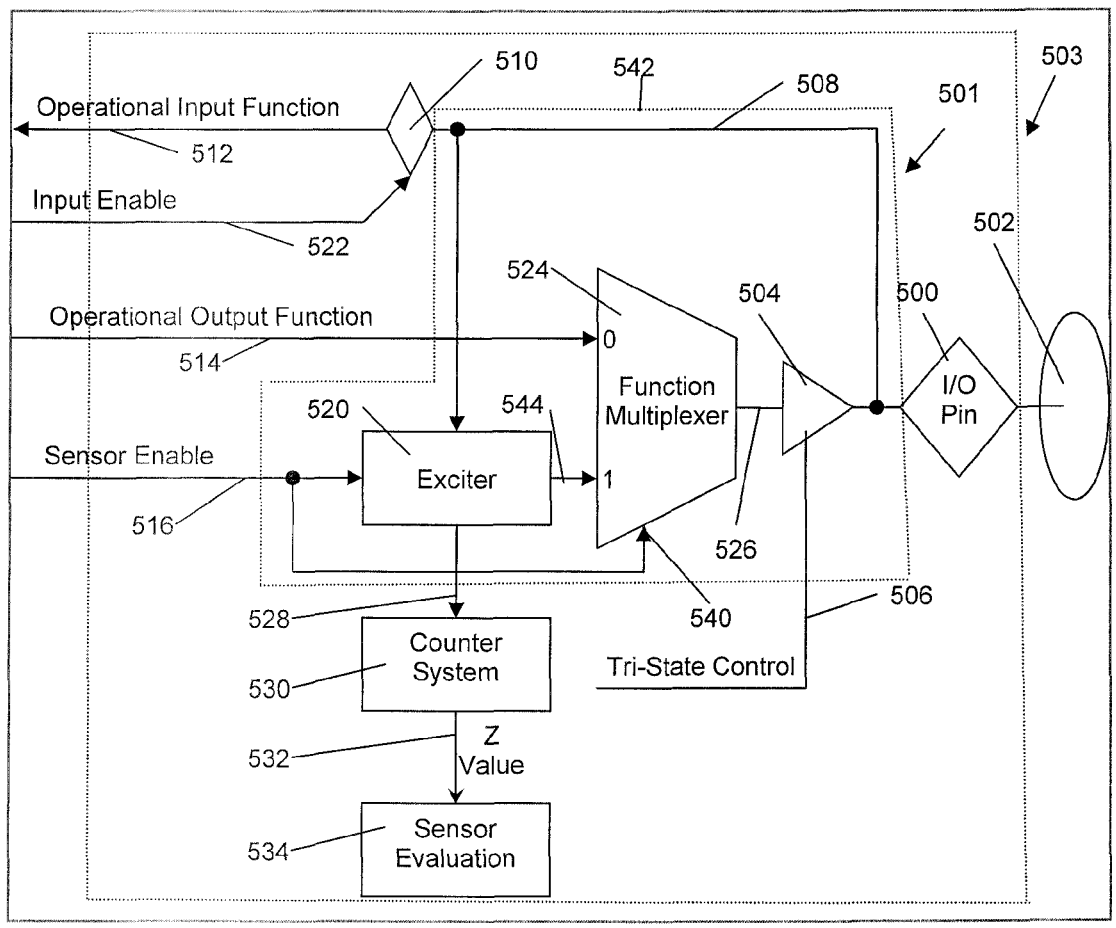
Figure 8, Sensor implemented on a dual use pin

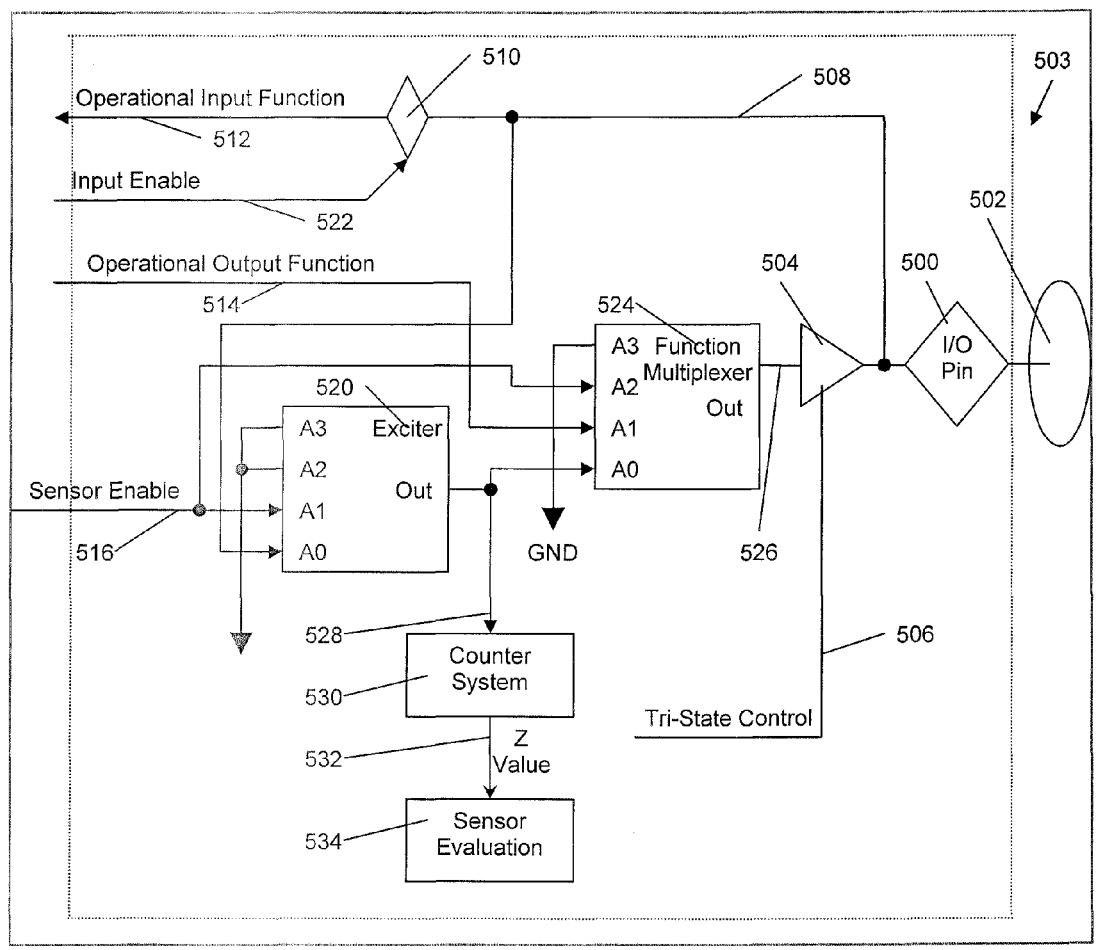
Figure 9, Phantom Sensor implemented on a dual use pin with Look Up Table Logic

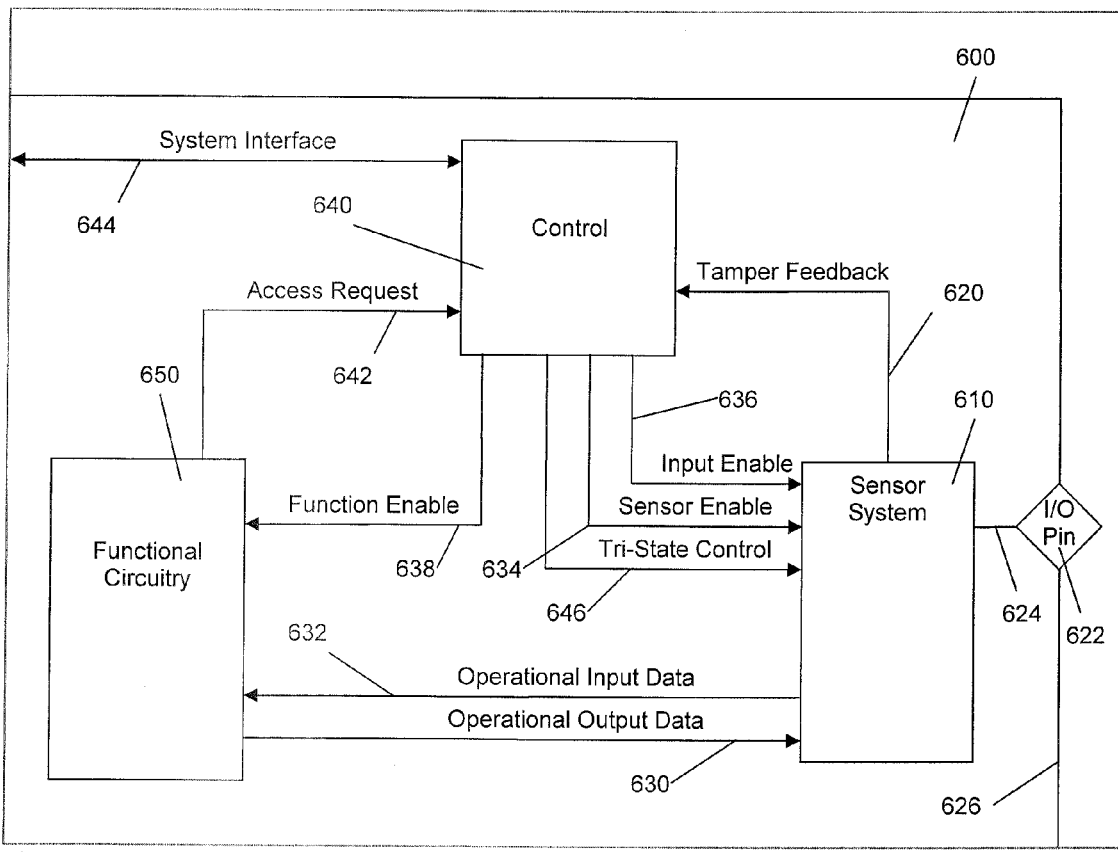
Figure 10, Sensor System in relationship to other IC Circuitry

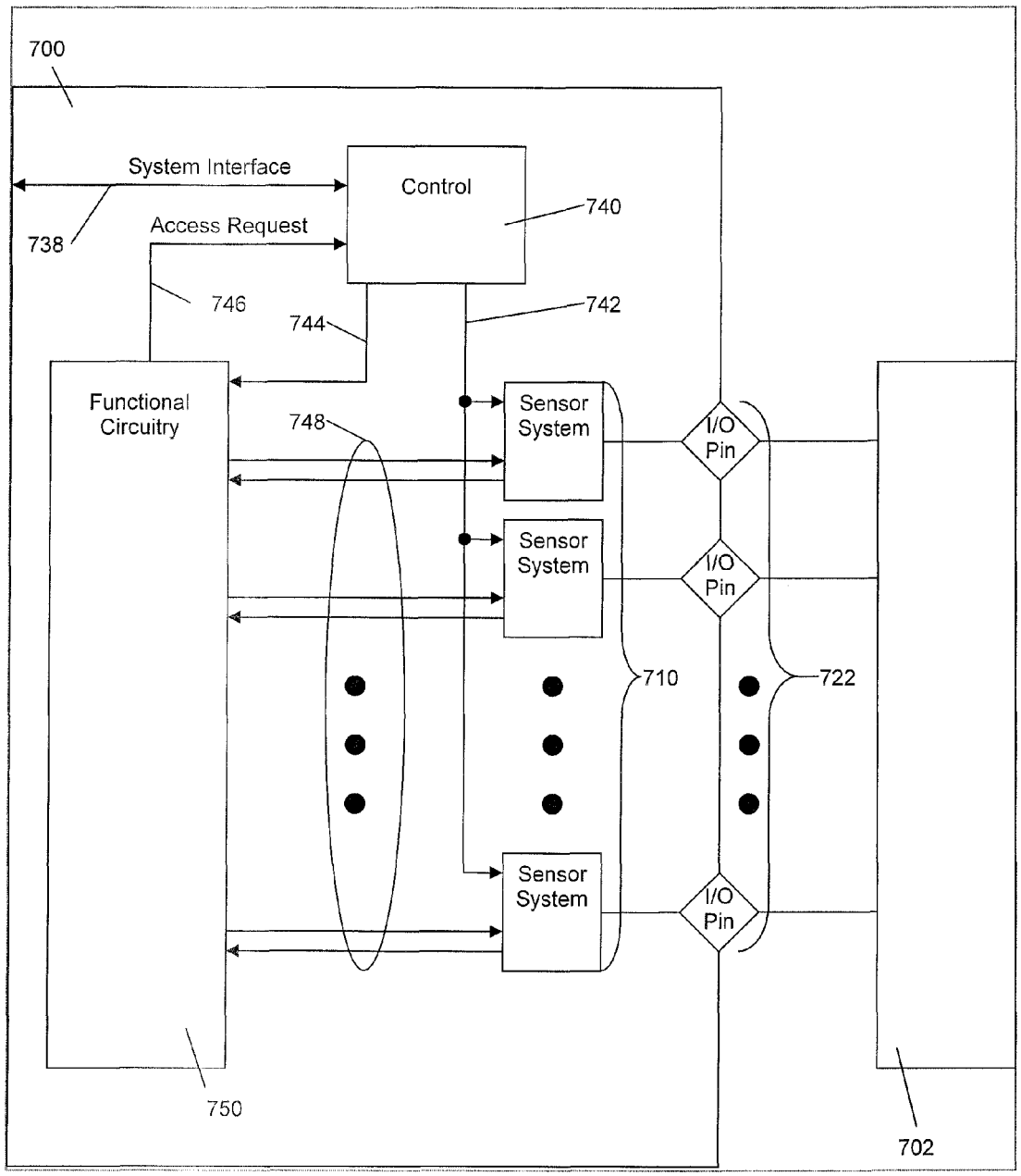
Figure 11,

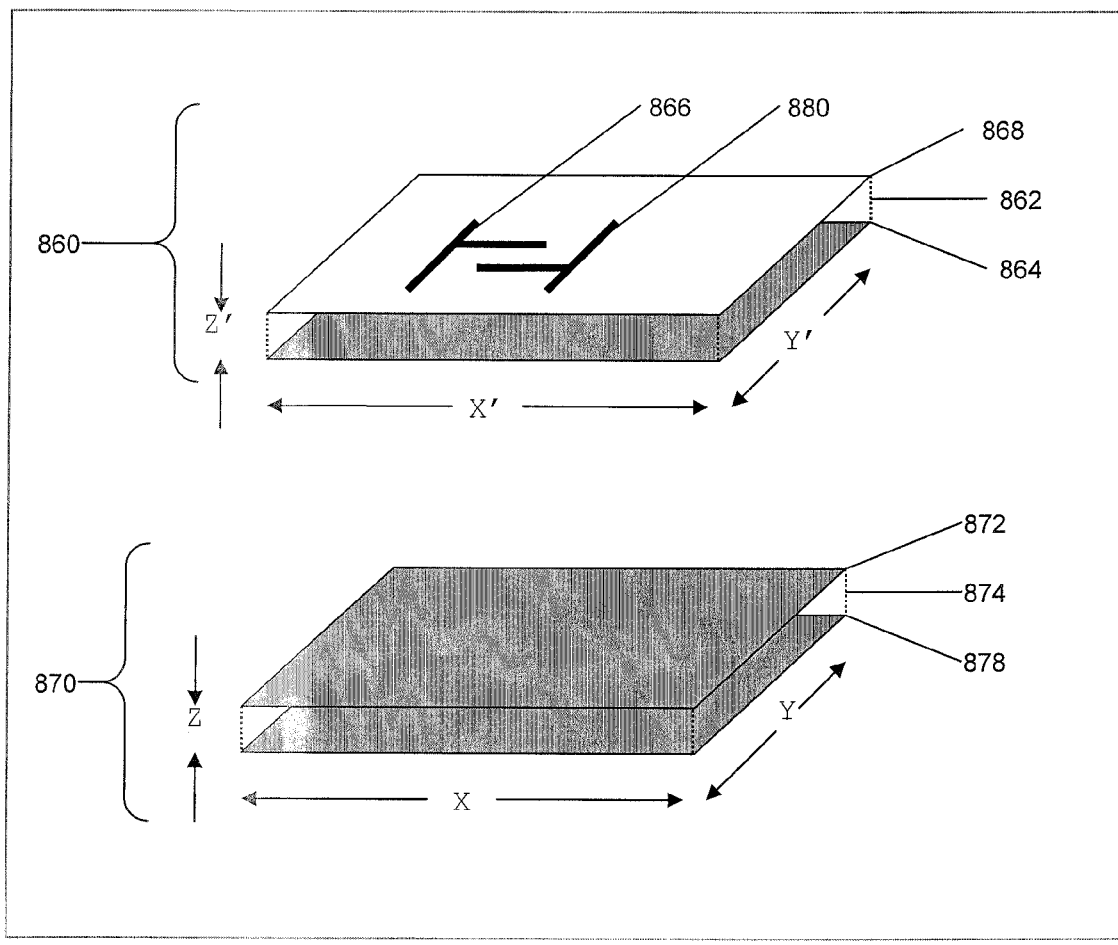
Figure 12, comparison of classic capacitor structure to PCB trace.

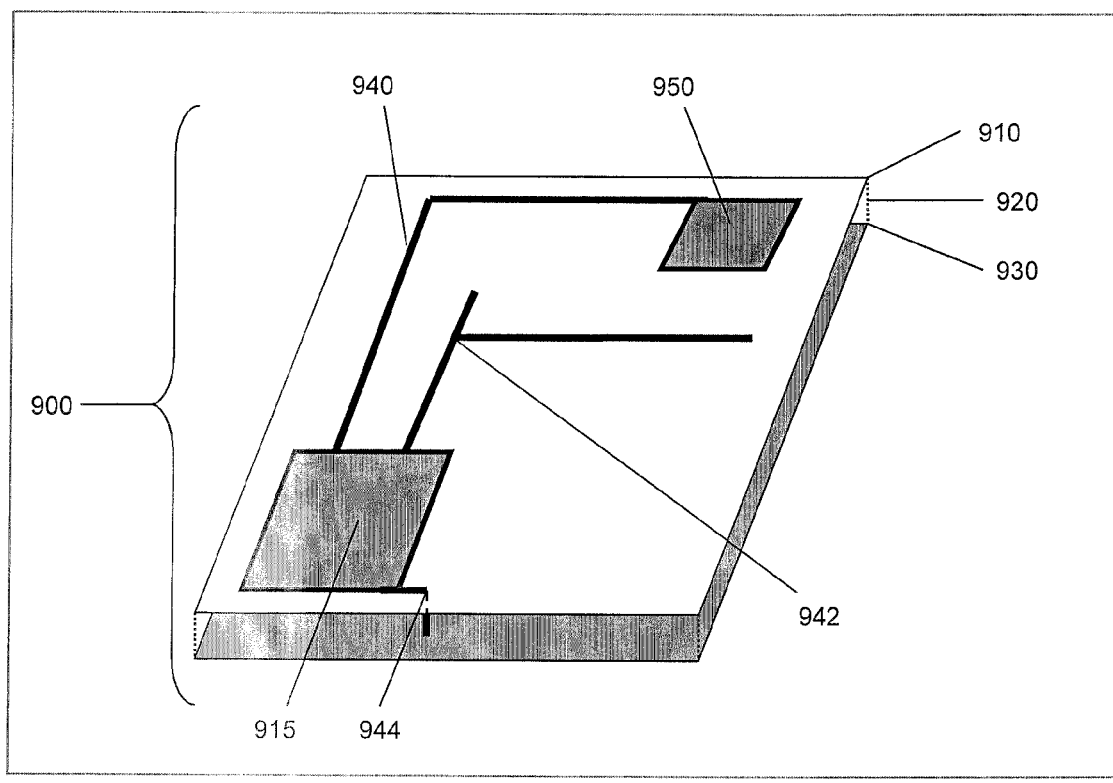
Figure 13, PCB with tamper sensor instrumented circuit traces

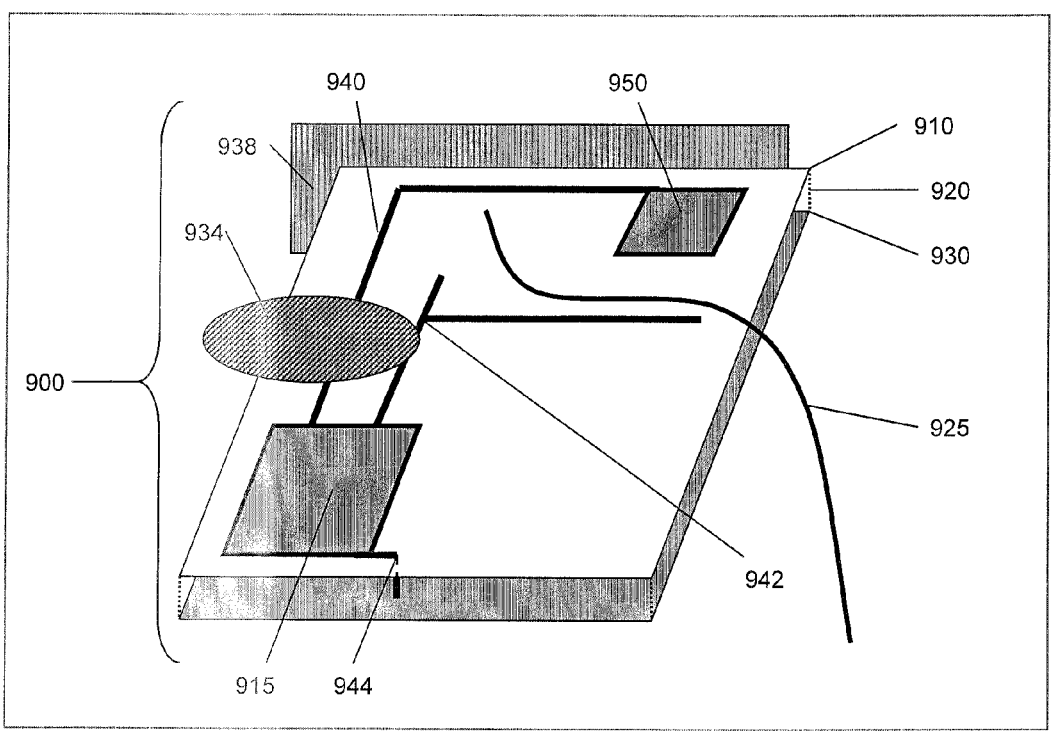
Figure 14, PCB with tamper sensor instrumented circuit traces and added components

METHOD AND SYSTEM FOR DETECTION OF TAMPERING RELATED TO REVERSE ENGINEERING

CROSS REFERENCE TO RELATED PATENT APPLICATIONS

The present application claims the benefit of U.S. Provisional Patent Application Ser. No. 61/154,540, entitled "METHOD AND SYSTEM FOR DETECTION OF TAMPERING RELATED TO REVERSE ENGINEERING", filed Feb. 23, 2009.

BACKGROUND OF THE INVENTION

1. Field of the Invention

The invention relates a method and system for detecting tampering related to attempts at reverse engineering of electronic circuits.

2. Description of the Related Art

Intellectual property is embodied in many forms and must be protected by diverse means. The development of solid-state electronics has lead to the incorporation of intellectual property into the design and programming of integrated circuits.

Reverse engineering is a process that is used to determine undisclosed details of a device design. When such intellectual property considerations are incorporated into an integrated circuit, competitors, analysts and others interested in determining the functional aspects of the integrated circuit very often resort to electronic forensic techniques to determine the underlying design considerations employed in the integrated circuits. Those attempting to access and study the integrated circuit may also be someone interested in determining the functional aspect of a system in which the integrated circuit is used, for example, one interested in determining the functional aspect of an integrated circuit or an electronic system which incorporates the integrated circuit.

While reverse engineering is at times employed for legitimate purposes, reverse engineering is often employed by competitors as a means of capturing and exploiting the intellectual technology of others. As such, there is a need for techniques and processes that protect products and technology from reverse engineering. Processes and techniques for protecting technology from reverse engineering are sometime referred to as anti-tamper (AT) technologies.

SUMMARY OF THE INVENTION

It is, therefore, an object of the present invention to provide a sensor system for protecting products and technology from reverse engineering by detecting attempts to probe electronic circuitry. The sensor system includes a sensor electrically linked to electronic circuitry. The sensor detects interaction of probe devices with the electronic circuitry for the purpose of reverse engineering the electronic circuitry. The sensor includes an exciter and an impedance counter linked to the exciter. A count rate of the impedance counter is a function of the impedance of the electronic circuitry due to the fact that oscillation frequency generated by the exciter is also a function of the impedance of the electronic circuitry. The sensor also includes an impedance register storing the binary count value from the impedance counter, wherein after the impedance counter data is transferred into the impedance register, the data is referred to as impedance data. The sensor also includes a reference oscillator monitoring count rate of the impedance counter and a sensor evaluation system comparing the impedance value to threshold values to determine if a significant change has occurred. When changes have occurred this is indicative of abnormal behavior and may be indicative of tampering relating to the evaluation of the electronic circuit for the purpose of reverse engineering.

It is also an object of the present invention to provide a sensor system wherein the exciter is composed of an inverter with a predetermined delay to implement an oscillation function It is another object of the present invention to provide a sensor system wherein the oscillation function is a function of the exciter and impedance of the electronic circuitry.

It is a further object of the present invention to provide a sensor system wherein the exciter is composed of a ring oscillator.

It is also an object of the present invention to provide a sensor system wherein the sensor is implemented in PLD.

It is another object of the present invention to provide a sensor system wherein the sensor is implemented in ASIC.

It is a further object of the present invention to provide a sensor system wherein the impedance counter includes a binary counter.

It is also an object of the present invention to provide a sensor system wherein the reference oscillator includes an output that drives a reference counter measuring a specific interval of time for the purpose of monitoring count rate of the impedance counter, It is another object of the present invention to provide a sensor system wherein after the impedance counter data is transferred into the impedance register, the data is referred to as impedance data.

It is a further object of the present invention to provide a sensor system including a feedback signal linked to the exciter. The feedback signal is used to drive a clock input of a binary counter forming the impedance counter.

It is also an object of the present invention to provide a sensor system wherein the reference oscillator is composed of a quartz oscillator.

It is another object of the present invention to provide a sensor system wherein the exciter is composed of multiple oscillator inverters, and each of the oscillator inverters outputting an impedance frequency signal used as a clock for the impedance counter.

It is a further object of the present invention to provide a sensor system including an AND gate to indicate a desired count value for enablement of the impedance counter and the impedance register.

It is also an object of the present invention to provide a sensor system wherein the sensor evaluation system includes a first comparator and a second comparator, wherein the second comparator compares the impedance value with a threshold value stored in a low limit register. When the impedance value is below the low limit threshold value, an A<B output of the second comparator indicates that a change in impedance has been detected, and the impedance value is compared to a high limit threshold value stored in a register, and when the impedance value is greater than the high limit threshold value, the A<B output of the first comparator indicates that a change in impedance has been detected.

It is another object of the present invention to provide a sensor system wherein the sensor evaluation system employs threshold limits in determining tampering and the threshold limits are determined dynamically.

It is a further object of the present invention to provide a sensor system including a dual I/O pin connected between the sensor and the electronic circuitry.

It is also an object of the present invention to provide a sensor system including a tri-state buffer and a function multiplexer linked to the exciter.

It is another object of the present invention to provide a sensor system wherein the multiplexer is implemented using Look Up Tables and the exciter is implemented using Look Up Tables.

It is a further object of the present invention to provide a sensor system wherein the exciter is implemented using Look Up Tables.

It is also an object of the present invention to provide a sensor system wherein the electronic circuitry is in the form of a printed circuit board.

Other objects and advantages of the present invention will become apparent from the following detailed description when viewed in conjunction with the accompanying drawings, which set forth certain embodiments of the invention.

BRIEF DESCRIPTION OF THE DRAWINGS

FIG. 4 is a schematic showing the reference counter and impedance counter components in detail.

FIG. 5 is a timing diagram of the reference counter and impedance counter.

FIG. 6 is a schematic of a sensor evaluation system.

FIG. 7 illustrates a system for the determining threshold limits dynamically.

FIG. 8 is a schematic of an alternate embodiment of the sensor in accordance with the present invention.

FIG. 9 is a schematic of an alternate embodiment of the sensor in accordance with the present invention.

FIG. 10 is a schematic of the sensor in accordance with the present invention shown in conjunction with other integrated circuit components.

FIG. 11 is a schematic showing implementation of the present invention with multiple sensors.

FIG. 12 is a schematic comparing classic capacitor structure to a printed circuit board trace.

FIG. 13 is a schematic of a printed circuit board with tamper sensor instrumented circuit traces in accordance with the present invention.

FIG. 14 is a schematic of a printed circuit board with tamper sensor instrumented circuit traces and added components in accordance with the present invention.

DESCRIPTION OF THE PREFERRED EMBODIMENTS

Figure 1:
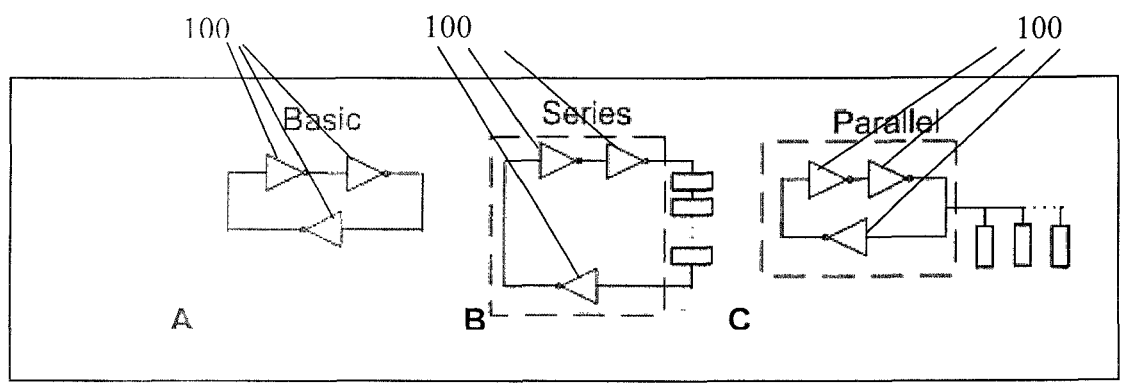
FIG. 1 is a schematic showing various ring oscillators that may be used in accordance with the present sensor.

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as a basis for teaching one skilled in the art how to make and/or use the invention.

In accordance with the present invention, and with reference to the various figures, a method and system for protecting products and technology from reverse engineering by detecting attempts to probe electronic circuitry is disclosed herein. The present method and system employs a sensor that detects the interaction of probe devices with electronic circuitry for the purpose of reverse engineering the electronic circuitry. Such probe devices include, but are not limited to, oscilloscope probes, logic analyzer probes, and other foreign devices that may attach to electronic circuitry for the purpose of reverse engineering the electronic circuitry. The present sensor may be implemented in discrete logic, in Programmable Logic Devices (PLD), in Application Specific Integrated Circuits (ASIC), or in microprocessor-based circuits. The embodiments described herein specifically anticipate implementations of the present sensor in these applications.

The present invention when implemented in ASICs, PLDs, and some microprocessor implementations, does not require the addition of individual components for implementation of the sensor embodied by the present invention. As such, the present sensor may be implemented in a manner which creates no evidence of the incorporation of sensor circuitry to the electronic circuit being protected. When reverse engineering a product or design, any sensors that have been designed into the system for the purpose of detecting, preventing and frustrating the reverse engineering process must be identified and defeated or disabled before one may reverse engineer the product or design. Since the present sensor does not exist as a separate entity, it cannot be identified and defeated. In practice, and as will be appreciated based upon the following disclosure, the present sensor is completely implemented inside the ASIC, PLD, or microprocessor. In these embodiments of the present sensor, an electronic device with implementation of the present sensor contains the identical components as a device lacking the present sensor.

While the underlying concepts embodied by the present invention may be implemented and demonstrated using discrete logic, such an implementation does not provide the stealth and phantom nature that other implementations provide. Further, full implementation in discrete logic would require numerous components. As such, it is preferred that the present invention be implemented in PLD and the remainder of this disclosure is directed to describing such an implementation in accordance with the spirit of the present invention. It should be understood the implementation of the present sensors in ASICs is identical to the PLD implementation. The implementation of the present sensors in microprocessor based circuitry is closely similar, if not entirely identical, to the implementation in programmable logic.

The present sensor may be implemented in programmable logic, ASICs, and microprocessors in such a manner that the integrated circuit pin that provides the sensor access also provides other functionality; that is, the integrated circuit pin providing the sensor access is adapted for dual use. As a result, the integrated circuit pin may provide an input or output function, which also provides the sensor function in accordance with the present invention. This is important because an adversary attempting to reverse engineer a product would determine which integrated circuit pins are of interest and probe those integrated circuit pins. These component integrated circuit pins may be memory interfaces, test ports, communication interfaces, or practically any other type of Input or Output I/O). In short, an important advantage of the present sensor is the dual use functionality of the sensor I/O.

Figure 2:
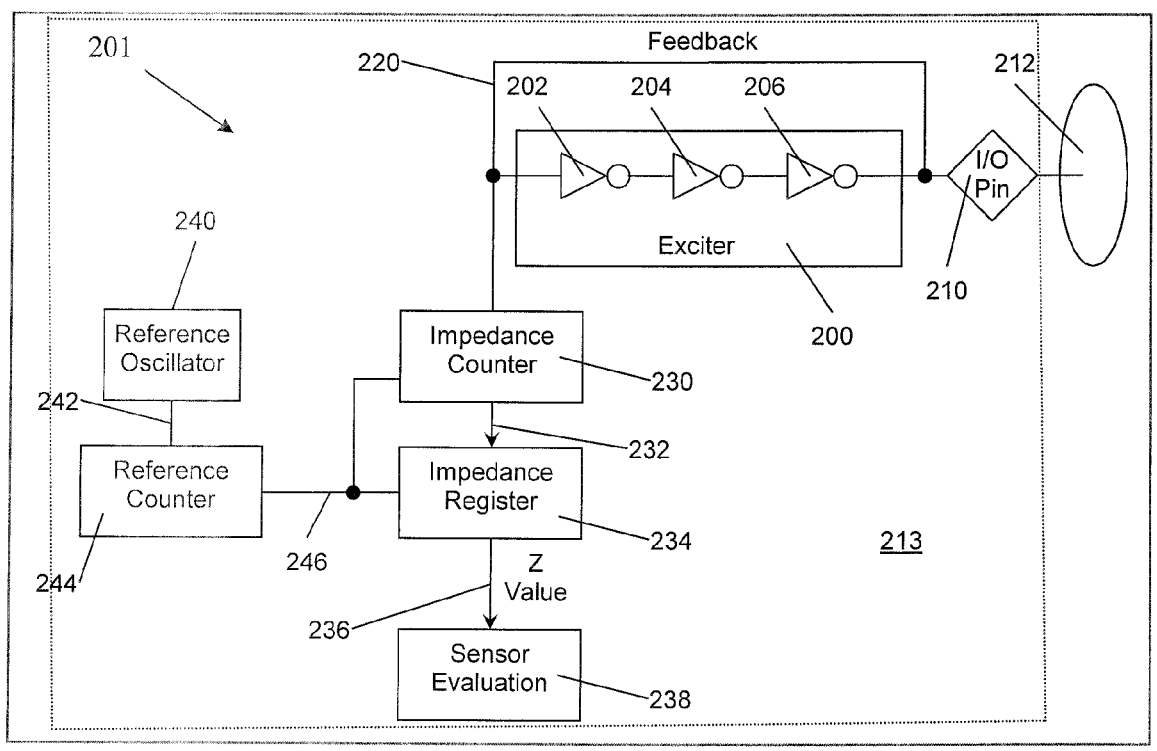
FIG. 2 is a schematic of a sensor in accordance with the present invention.

The basic sensor 201 employed in accordance with the present invention is illustrated in FIG. 2. Three ring oscillator inverters 202, 204, 206 are shown grouped in a block labeled "Exciter" 200. The exciter will be shown as a block in following illustrations.

As those skilled in the art will certainly appreciate, ring oscillators, sometimes referred to as "inverter feedback oscillators" are a well known technique for implementing a low cost oscillator in logic devices. Referring to FIG. 1, a basic ring oscillator (A) and the logical inverters 100 that make up the oscillator are shown. Variations on the basic oscillator are illustrated with additional components connected to the ring oscillator network in series (B) and in parallel (C).

The frequency of the ring oscillator is a function of the propagation delay of the digital inverters and of the impedance of the connecting signals between each inverter. If discrete logic is used to implement the ring oscillator and the resulting oscillator is connected to a specific signal trace, the resulting frequency of oscillation is partially a function of the impedance of the signal trace. If changes are made to the signal trace impedance, the rate of oscillation will change. Connecting an oscilloscope probe to the signal trace will result in sufficient change in impedance to cause a measurable change in oscillation frequency. A logic analyzer probe will have a similar effect as will the connection of a wire, connection of passive components, a human touch, and even the proximity of conductive and non-conductive materials.

The exciter 200 takes advantage of the functionality of traditional ring oscillators. While three ring oscillator inverters are disclosed herein in accordance with describing the present invention, the specific construction of the exciter may take a variety of forms just as traditional ring oscillators are known to be constructed in a variety of configurations. The exciter 200 may be constructed of any logic that implements an inverter with appropriate delay to implement the oscillation function required in accordance with implementation of the present invention. A single inverter with built-in hysteresis (such as, for example a 74HC14 Schmitt Trigger device) is effective as a ring oscillator as are other circuits that will be described later in the present disclosure. Since the exciter 200 function may be implemented in PLD, ASIC, or microprocessor circuitry, it is important to note that the specific implementation of the exciter 200 is not as important as the oscillation affect that results from the connection of the exciter 200 to the external circuit.

The exciter 200 is located in relatively close proximity to the IC I/O pin 210 that serves as the interconnection between the sensor and the external circuitry 212 found upon (or otherwise connected to) the integrated circuit 213. The feedback signal 220 is shown separately from the exciter 200 for clarity and to aide in explaining the transition to other circuits described later in the present disclosure.

As discussed earlier, the exciter 200 causes an oscillation that affects both the feedback signal 220 and the external circuitry 212. The frequency of the oscillation resulting from the exciter 200 is a function of the exciter 200, the impedance of the external circuitry 212, and to a lesser extent, the impedance of feedback signal 220. It is, therefore, important that the exciter 200 be coupled as closely to the external circuitry 212 as possible and that the impedance counter 230 be isolated from the external circuitry 212 so as to optimize the integrity of the count generated by the impedance counter 230 as discussed below in greater detail. If the impedance counter 230 is not isolated from the external circuitry 212, the impedance of the counter input can add to the system impedance being monitored. The impedance of the system is independent of any effect contributed by the impedance counter 230 when the impedance counter 230 is connected to Impedance Frequency 1 or Impedance Frequency 2 as shown in FIG. 3 and as discussed below.

Figure 3:
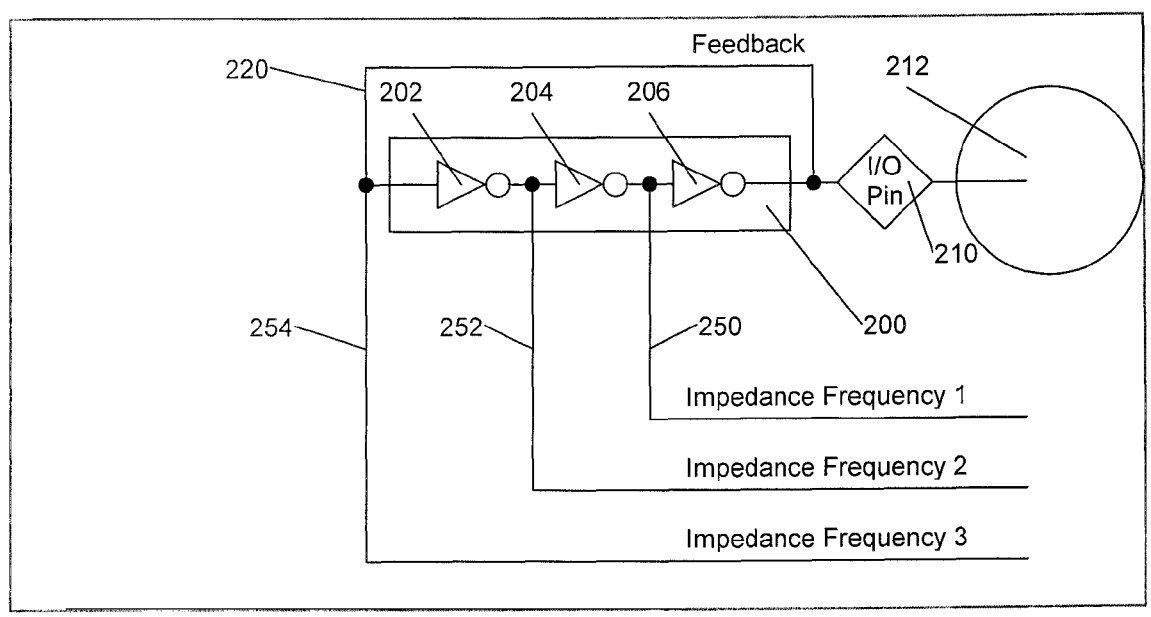
FIG. 3 is a schematic of an exciter in accordance with the present invention.

The feedback signal 220 is used to drive the clock input of a binary counter forming the impedance counter 230 of the sensor 201 (see FIG. 3 and accompanying explanation on alternative and improved schemes for clocking the impedance counter). The count rate of the binary counter malting up the impedance counter 230 is a function of the impedance of the external circuitry 212 due to the fact that the oscillation frequency generated by the exciter 200 is also a function of the external signal impedance. The binary count value from the impedance counter 230 is stored into an impedance register 234. The count value is conducted from the impedance counter 230 to the impedance register 234 via a signal bus 232.

The present sensor 201 includes a relatively reliable and stable oscillator referred to as the reference oscillator 240. The reference oscillator 240 must be relatively consistent over temperature extremes and over long periods of time. In accordance with a preferred embodiment, the reference oscillator 240 is composed of a quartz oscillator with 100 ppm frequency accuracy, although it is contemplated other highly reliable oscillators may be used in conjunction with the present sensor without departing from the spirit of the present invention.

The output 242 of the reference oscillator 240 drives a binary counter referred to as the reference counter 244. The reference counter 244 is used to measure a specific interval of time (or a time reference) for the purpose of monitoring count rate of the impedance counter 230, which is ultimately used to determine undesirable access to the external circuit based upon monitored variations in the count rate generated by the exciter 200 as monitored by the impedance counter 230. When the specific interval of time has elapsed, the reference counter 244 generates control signals 246 for the impedance counter 230 and the impedance register 234. These control signals 246 cause the following events to occur: (1) the impedance counter 230 is temporarily disabled (that is, the impedance counter 230 stops counting), (2) the data value (that is, the count value which represents the oscillation rate) in the impedance counter 230 is transferred into the impedance register 234 via the signal bus 232, (3) the impedance counter 230 is cleared (zeroed) and allowed to restart its counting process. The time interval is set sufficiently long enough that changes in impedance result in a sufficient change in the count value generated by the impedance counter 230 so that changes in the count rate are detectable and significant. One millisecond is a sufficient time interval for some applications. Longer or shorter increments may be applicable in other applications.

After the impedance counter 230 data is transferred into the impedance register 234, the data is referred to as impedance data or impedance value. The symbol Z may be used to refer to the impedance value based on the mathematical symbol, Z, for impedance. The impedance value does not translate directly to a specific impedance measured in ohms, but does indicate a relative impedance value and whether a change in relative impedance has occurred. In general, the impedance value is a numeric value that, through comparison of the values generated over a period of time, is indicative of impedance changes in the external circuit based upon tampering and other events. The Z Value is transferred via signal bus 236 into a sensor evaluation system 238 that compares the impedance value to threshold values to determine if a significant change has occurred. When changes have occurred this is indicative of abnormal behavior and may be indicative of tampering relating to the evaluation of the electronic circuit for the purpose of reverse engineering. Details of the sensor evaluation system 238 are discussed below in greater detail.

Variations on the design of the exciter 200 are contemplated and are needed to implement some of the important variation to the overall sensor 201. First, the impedance frequency signal used as a clock for the impedance counter 230 may be generated at any point in the ring oscillator defined by ring oscillator inverters 202, 204, 206. FIG. 3 shows the exciter 200 from FIG. 2 with the ring oscillator inverters 202, 204, 206 having respective outputs 252, 250, and 254 producing three different versions of the so-called impedance frequency. It can be shown that the three outputs 252, 250, and 254 of the respective ring oscillator inverters 202, 204, 206 have the same frequency and are only out of phase with each other. The sensor 201 will operate with more dependency on the impedance of the external circuitry 212 if the impedance counter 230 receives its clock from one of the inner outputs (or tap /points) 250 or 252 (that is, Impedance Frequency 1 and Impedance Frequency 2). Using the versions of the impedance frequency that are isolated somewhat from the I/O pin 210 leaves less internal circuitry connected directly to the external circuitry 212.

The exciter 200 may also be constructed of different logic elements in order to allow the oscillation generated thereby to be enabled and disabled. The use of an AND Gate in series with the ring oscillator inverters allows the oscillation to be disabled or turned off so that other functions may be enabled at the I/O pin. A ring oscillator composed of a single AND Gate and a Single Inverter may also work effectively while providing an optional enable input. An Exclusive OR Gate (XOR) may be use in place of one of the inverters to implement a similar enable/disable function. Since the sensor system of the present invention may be implemented in the look-up tables of a PLD, the concept of a logic gate is not even required. The ring oscillator may be implemented with truth tables stored in the PLD look-up table. It is contemplated various alternative implementations of a ring oscillators may be employed in accordance with the spirit of the present invention.

FIG. 4 illustrates a preferred embodiment of the reference counter and the impedance counter components. In accordance with this implementation, the reference counter 300 receives a clock signal 302 from the reference oscillator (not shown in this figure). The output count value 304 and 304' of the reference counter 300 is an n-bit wide bus. Specific bit value 304' of the output count are connected to an AND gate 310 to indicate the desired count value (implements an interval of slightly over 1 millisecond in this example) for enablement of the impedance counter 340 and the impedance register 344 as discussed herein in greater detail. The output 314 of the AND Gate 310 is routed through inverter 316 and flipflop 320 to create the ENABLE signal 326 for the impedance counter 340. The impedance counter 340 receives the impedance frequency 312 as its clock signal. This impedance frequency 312 may be output 250, 252, or 254 as discussed with Reference to FIG. 3. The ENABLE signal 326 enables the impedance counter 340 until the desired count value is reached. The output 314 of the AND Gate 310 is also routed through flipflop 324 to create the ENABLE signal 328 for the impedance register 344. The ENABLE signal 328 then routs through flipflop 324 to produce the CLEAR signal 330 which is connected to the CLEAR input of the Impedance Counter 340.

When the output count value 304 of the reference counter 300 is less than the desired terminal value, the impedance counter 340 is enabled by ENABLE signal 326 and the impedance register 344 is not enabled. When the output count value 304 of the reference counter 300 reaches the desired terminal count value, the AND Gate 310 outputs a logical "1" that causes (1) the impedance counter 340 to stop counting because the ENABLE signal 326 becomes a logical "0" (low) value, (2) the impedance register 344 is enabled because the Enable signal 328 becomes a logical "1" (high) value, and (3) the x-bit impedance value 346 (the output of impedance register 344) assumes the last value of the x-bit output of the impedance counter 342. One reference clock cycle later the CLEAR signal 330 and 330' becomes true causing both counters to reset so that the process starts over.

FIG. 5 shows the timing diagram of the reference counter 300 and impedance counter 340 around the terminal count time T.

The sensor evaluation system 238 (see FIG. 2) compares the impedance value or Z Value (as received from signal bus 236 in FIG. 2, 346 in FIGS. 4 and 5) stored in the impedance register (234 in FIG. 2, 344 in FIG. 4) to threshold values in order to determine whether the change in impedance has exceeded acceptable levels. These impedance values may be stored for later evaluation or provided to an alarm system for immediately indicating that tampering has occurred and should be addressed.

FIG. 6 shows an implementation of the sensor evaluation system. The impedance value 400 is input into first and second comparators 410, 420. The second comparator 420 compares the impedance value 400 with a threshold value stored in the low limit register 414. When the impedance value is below the low limit threshold value, the A<B output 416 of the second comparator 420 indicates that a change in impedance has been detected. Similarly, the impedance value 400 is compared to a high limit threshold value stored in high limit register 412. When the impedance value 400 is greater than the High Limit threshold value, the A<B output 418 of the first comparator 410 indicates that a change in impedance has been detected. In this implementation, the outputs 416, 418 of the first and second comparators 410, 420 are logically combined (logical OR) so that the resulting detection signal 424 indicates any impedance value outside the acceptable limits.

The threshold values that determine the acceptable impedance limits may be determined ahead of time and stored in the respective register or these values may be determined dynamically. In the case of dynamic determination of the threshold limits, the sensor is allowed to operate for some period of time. The highest impedance value recorded during this test time is stored into a register as is the lowest recorded impedance value. An adjustment value is applied to each of the stored values and the adjusted value is transferred into the respective limit registers.

FIG. 7 illustrates a system for the determining threshold limits dynamically. When this system begins operation, the high temporary register 430 (an x-bit wide binary register) is cleared by insertion of all zeros and the low temporary register 432 (an x-bit wide binary register) is set to all ones. The first comparator 434 compares the x-bit impedance value 400 to the x-bit value 438 stored in the high temporary register 430. When the impedance value 400 is greater than the stored x-bit value 438, the high temporary register 430 is enabled by the A<B output 436 of the first comparator 434 and the impedance value data is clocked into the high temporary register 430 on the next rising edge of the clock signal 450. Because any impedance value will be greater than zero (that the high temporary register 430 has been cleared to), the high temporary register 430 will receive the first impedance value 400 at the start of the process.

Similarly, the second comparator 440 compares the x-bit impedance value 400 to the x-bit value 444 stored in the low temporary register 432. When the impedance value 400 is less than the stored x-bit value 444, the low temporary register 432 is enabled by the A<B output 442 of the second comparator 440 and the impedance value data is clocked into the low temporary register 432 on the next rising edge of the clock signal 450. Because any impedance value 400 will be less than the "all ones" value that the low temporary register 432 has been set to, the low temporary register 432 will receive the first impedance value at the start of the process.

The upper limit adjust 452 adds an appropriate buffer value to the x-bit value 438 stored in the high temporary register 430 to produce the high limit value 456 which is output to be stored in a high limit register 412 as shown in FIG. 6. Similarly, the low limit adjust 454 subtracts an appropriate value from the x-bit value 444 stored in low temporary register 432 to produce the low limit value 458 to be stored in a low limit register 414 as illustrated in FIG. 6. The adjustment of the limit values provides some tolerance to the values that have been observed. The magnitude of the adjustment value may be pre-determined or may be derived as a function of the difference between the high and low temporary values, the magnitude of temporary values, or some combination of methods. Many functions for producing the adjustment value may be employed without violating the spirit of this patent.

After the threshold determination process has operated for an appropriate length of time, the high limit value 456 and the low limit value 458 are loaded into high limit register 412 and low limit register 414 as shown in FIG. 6. This application anticipates the use of multiple limit registers to indicate different levels of impedance change that would require different levels of response.

In order to meet all of the needs of a system employing the present sensors, the sensors must be implemented together with other functions on the I/O pin. This is referred to as a dual use pin, that is, the pin has an operational function and a sensor function. The operational function may be any type of binary function, input, output, or control. The operational functional may also be an analog function if the appropriate analog multiplexing is implemented.

FIG. 8 illustrates a sensor 501 implemented on a dual use I/O pin 500 connected to an integrated circuit 503. The sensor 501 is composed of an exciter 520, a counter system 530 (which includes the circuitry illustrated in FIG. 4), a sensor evaluation system 534 (which includes the circuitry shown in FIG. 6 and may include the circuitry shown in FIG. 7), a tri-state buffer 504, a function multiplexer 524, and associated connecting signals 528, 526, 532, 508.

Operation of the multiplexer 524 is controlled by the sensor enable signal 516 functioning as the selector input 540 of the multiplexer 524. The sensor 501 is enabled when the multiplexer 524 is set to output at connecting signal 526 the signal connected at input 1 (that is, when the sensor enable signal 516="1" and accordingly selects output of the signal at input 1) and when the Tri-state buffer 504 is set to transmit mode by the Tri-State Control signal 506. With these conditions met, the I/O pin 500 feedback is conducted to the exciter 520 by signal 508 and the ring oscillator 542 includes the exciter logic (internal to 520), the multiplexer 524, and the tri-state buffer 504 with connecting signals 508, 544 and 526 linking the components. This version of the exciter 520 includes an enable capability as previously discussed so that the sensor enable signal 516 enables the exciter 520 to oscillate when the multiplexer 524 is set to output the exciter function signal input transmitted from the excited 520 to input 1 of the multiplexer 524. The sensor enable signal 516 may be combined with the function multiplexer 524 since the ring oscillator driving the present sensor 501 is broken when the sensor enable signal 516, which functions as the selector input 540 of the multiplexer 524, is "0" and the operational output function 514 coming from, for example, the external circuitry 502 (and input 0 to the multiplexer 524) is selected for output from the multiplexer 524 at connecting signal 526. By separately enabling the exciter 520, the circuitry of the sensor 501 will not operate when the operational function, that is, the external circuitry 502 (or other circuit attached thereto) has control of the I/O pin 500. This will save power and reduce noise.

When the sensor enable signal 516 is set to "0", the exciter 520 is disabled and the function multiplexer 524 switches to output the operational output function 514 at connecting signal 526. When the sensor enable signal 516 is set to "0", the tri-state buffer 504 and the Tri-State Control signal 506 determine the function of the I/O pin 500 as either Input or Output. Gate function 510 allows an operational input function 512 to proceed to other internal logic, for example, of the external circuitry 502 based on the condition of input enable signal 522. The gate function 510 may be a simple AND Gate or other suitable device and is necessary because of the oscillatory nature of the sensor and its feedback signal. The external circuitry must be isolated from the present sensor oscillation in order to ensure consistent operation. The input enable signal 522 may be generated as a function of the sensor enable or generated independently.

As discussed above, it is contemplated various implementations of ring oscillators may be employed. Such an embodiment is disclosed with reference to FIG. 9. As background to the following disclosure, and as those skilled in the art will certainly appreciate, in programmable logic, combinational logic functions are implemented in Look Up Tables (LUT). A look up table is a memory device that uses the address lines as input and allows the data stored in memory to implement the output. It is well known that a four input LUT (a 16 address by 1-bit memory) can implement any four input combinational logic function. A simple inverter can be implemented with a LUT by specifying that the output is the inverse of the input. A four input memory is shown in Table 1 such that address bit A0 receives the feedback signal and all other address bits are don't cares (gray shading).

TABLE 1

LUT implementation of an inverter

| Inputs | | | | Output |
|---|---|---|---|---|
| A3 | A2 | A1 | A0 | |
| 0 | 0 | 0 | 0 | 1 |
| 0 | 0 | 0 | 1 | 0 |
| 0 | 0 | 1 | 0 | 1 |
| 0 | 0 | 1 | 1 | 0 |
| 0 | 1 | 0 | 0 | 1 |
| 0 | 1 | 0 | 1 | 0 |
| 0 | 1 | 1 | 0 | 1 |
| 0 | 1 | 1 | 1 | 0 |
| 1 | 0 | 0 | 0 | 1 |
| 1 | 0 | 0 | 1 | 0 |
| 1 | 0 | 1 | 0 | 1 |
| 1 | 0 | 1 | 1 | 0 |
| 1 | 1 | 0 | 0 | 1 |
| 1 | 1 | 0 | 1 | 0 |
| 1 | 1 | 1 | 0 | 1 |
| 1 | 1 | 1 | 1 | 0 |

In order to implement a ring oscillator using this look up table, a suitable delay circuit is required between the output and A0. Three of these LUTs may be linked together to make the ring oscillator (which is what is actually implemented in programmable logic in some cases).

A LUT may also be used to implement a ring oscillator with an ENABLE functionality. In this case, the A0 input is the feedback signal (for example, feedback signal 220 as shown with reference to FIGS. 2 and 3). A1 is the ENABLE input and A2 and A3 are Don't Cares. The inverter is enabled when the A1 input="0" (the need for this will become apparent later, but the LUT may also be implemented so that the inverter is enabled when A1="1".) Table 2 shows an implementation where the output is "0" if the inverter is not enabled by the appropriate input to A1, Table 3 shows and implementation where the output equals the input when the inverter is disabled and equals the inverse of the input when the inverter is enabled. Table 3 may also be considered to function as an XNOR (Exclusive NOR) with the inputs at A0 and A1.

TABLE 2

LUT implementation of an enabled inverter

| Inputs | | | | Output | Function |
|---|---|---|---|---|---|
| A3 | A2 | A1 | A0 | | |
| 0 | 0 | 0 | 0 | 1 | Enabled |
| 0 | 0 | 0 | 1 | 0 | Enabled |
| 0 | 0 | 1 | 0 | 0 | Disabled |
| 0 | 0 | 1 | 1 | 0 | Disabled |
| 0 | 1 | 0 | 0 | 1 | Enabled |
| 0 | 1 | 0 | 1 | 0 | Enabled |
| 0 | 1 | 1 | 0 | 1 | Disabled |
| 0 | 1 | 1 | 1 | 0 | Disabled |
| 1 | 0 | 0 | 0 | 1 | Enabled |
| 1 | 0 | 0 | 1 | 0 | Disabled |
| 1 | 0 | 1 | 0 | 1 | Disabled |
| 1 | 0 | 1 | 1 | 0 | Disabled |
| 1 | 1 | 0 | 0 | 1 | Enabled |
| 1 | 1 | 0 | 1 | 0 | Disabled |
| 1 | 1 | 1 | 0 | 1 | Disabled |
| 1 | 1 | 1 | 1 | 0 | Disabled |

TABLE 3

LUT implementation of an alternative enabled inverter or XNOR

| Inputs | | | | Output |
|---|---|---|---|---|
| A3 | A2 | A1 | A0 | |
| 0 | 0 | 0 | 0 | 1 |
| 0 | 0 | 0 | 1 | 0 |
| 0 | 0 | 1 | 0 | 0 |
| 0 | 0 | 1 | 1 | 1 |
| 0 | 1 | 0 | 0 | 1 |
| 0 | 1 | 0 | 1 | 0 |
| 0 | 1 | 1 | 0 | 1 |
| 0 | 1 | 1 | 1 | 0 |
| 1 | 0 | 0 | 0 | 1 |
| 1 | 0 | 0 | 1 | 0 |
| 1 | 0 | 1 | 0 | 0 |
| 1 | 0 | 1 | 1 | 1 |
| 1 | 1 | 0 | 0 | 1 |
| 1 | 1 | 0 | 1 | 0 |
| 1 | 1 | 1 | 0 | 0 |
| 1 | 1 | 1 | 1 | 1 |

One final example applicable to the present sensor is a LUT used to implement a two input multiplexer. In this example, Input A2 serves as the select line. When A2="0", the output=A0 Input, when A2=1, the output=A1 input. (A3 is a "don't care" and is again shaded gray).

TABLE 4

LUT implementation of a 2-Input Multiplexer

| Inputs | | | | Output |
|---|---|---|---|---|
| A3 | A2 | A1 | A0 | |
| 0 | 0 | 0 | 0 | 0 |
| 0 | 0 | 0 | 1 | 1 |
| 0 | 0 | 1 | 0 | 0 |
| 0 | 0 | 1 | 1 | 1 |
| 0 | 1 | 0 | 0 | 0 |
| 0 | 1 | 0 | 1 | 0 |
| 0 | 1 | 1 | 0 | 1 |
| 0 | 1 | 1 | 1 | 1 |
| 1 | 0 | 0 | 0 | 0 |
| 1 | 0 | 0 | 1 | 1 |
| 1 | 0 | 1 | 0 | 0 |
| 1 | 0 | 1 | 1 | 1 |
| 1 | 1 | 0 | 0 | 0 |
| 1 | 1 | 0 | 1 | 0 |
| 1 | 1 | 1 | 0 | 1 |
| 1 | 1 | 1 | 1 | 1 |

Now we have sufficient logic to implement our ring oscillator and the present sensor through the implementation of an LUT. The implementation shown in FIG. 9 uses the same architecture as the sensor shown in FIG. 8 but the implementation uses LUTs 520, 524 to respectively replace the function multiplexer and the exciter. As will be appreciated from the following disclosure, all components in the embodiment of FIG. 9 are the same as those of FIG. 8 with the exception of the exciter and multiplexer being replaced with LUTs. The first LUT 520 functions as the exciter as described above and takes the form of the LUT described above with reference to Table 2. The second LUT 524 operates as the multiplexer as described above and takes the form of the LUT disclosed above with reference to Table 4.

When the sensor enable signal 516 (as discussed above with reference to the embodiment disclosed with reference to FIG. 8)="0" the exciter LUT 520 operates as an inverter of the feedback signal 508 on its A0 input and the multiplexer LUT 524 outputs the same inputs as received on its A0 input. The functional multiplexer LUT 524 also serves as a delay element to help implement the ring oscillator.

When the sensor enable signal 516="1", the exciter LUT 520 is disabled and output a zero into the functional multiplexer LUT 524 A0 input. The functional multiplexer LUT 524 outputs the same value input on its A1 input.

The unused inputs of both of the LUTs 520, 524 are tied to ground or logical "0". This gives a known constant input and eliminates glitches from the present system. Also, since the exciter LUT 520 always outputs a "0" when it is disabled, the operation of the functional multiplexer 524 is more reliable and glitch free.

The operation of Look Up Tables is extremely predictable. All of the LUT are identical memory devices and have exactly the same delay from the time that the input is stable until the output is valid. This predictable delay is in contrast to actual logic gates which exhibit different delays according to each function, an inverter having different delay from an AND gate for instance. The LUT is most stable, predictable, and free of glitches when only one input is changing at a time. The circuit shown in FIG. 9 allows only one input to change at a time for each LUT when the sensor enable signal 516 is set. Whenever the sensor enable signal 516 is set, the only input to LUT 520 that is changing is the feedback signal 508 on the A0 input. When the sensor enable signal 516 is low, the A0 signal is changing on the A0 input of LUT 524 and the operational output function is not operating and so is a constant value. When the sensor enable signal 516 is high, the A0 signal is disabled to a constant "0" so that only the operational output function 514 is changing.

Regardless of how a designer may design the exciter and multiplexer functions (as well as all other sensor functions) these functions will all be implemented in programmable logic as Look Up Tables and will basically match the implementation described. If the sensor is implemented as actual logic gates in an ASIC or discrete logic, the specific implementation of the ring oscillator and other sensor components will not change the basic principles of impedance based feedback on which this invention is based.

FIG. 10 illustrates the interconnection and interface between the present sensor 610 (as described above with reference to the various embodiments) and other circuitry within the integrated circuit 600, whether the integrated circuit is FPGA based or ASIC based. The integrated circuit 600 contains the sensor 610 in accordance with the present embodiment (and in particular, as illustrated in FIGS. 8 and 9), a control system 640, and functional circuitry 650 which will also utilize the I/O pin 622. The I/O pin 622 exists on the boundary of the integrated circuit 600 and serves as the interface between circuitry external to the integrated circuit 600 package and the circuits internal to the integrated circuit 600.

The functional circuitry 650 may be any circuit or electronics implemented in the integrated circuit 600 independently of the present sensor 610. The functional circuitry 650 may be implemented in a system with the present sensor 610 and could be directly connected to an I/O pin 622 in implementations that do not include the present sensor 610. In this application, the functional circuitry 650 operates exactly as it would if implemented without the present sensor 610 incorporated into the circuitry as shown with reference to the embodiment disclosed in FIG. 10.

The control system 640 coordinates the activities of the sensor 610 and the functional circuitry 650. Due to the oscillations caused by the sensor 610, the functional circuitry 650 cannot access the I/O pin 622 when the sensor 610 is performing an impedance check. Similarly, when the functional circuitry 650 is accessing the I/O pin 622, the sensor 610 must be disabled. The control system 640 ensures the proper access and operation of the I/O pin 622 by using enable signals 634, 636, and 638 to control the sensor 610 and ultimately the I/O pin 622. The input enable signal 636 is equivalent to input enable 522 as shown with reference to FIGS. 8 and 9. The sensor enable signal 634 is equivalent to sensor enable 516 as shown with reference to FIGS. 8 and 9. When the functional circuitry 650 does not require access to the I/O pin 622, the control system 640 disables the input enable signal 636 and enables the sensor enable signal 634 so that the sensor 610 is allowed to operate and analyze the impedance of the external circuits (no shown in FIG. 10). When the functional circuitry 650 requires access to the external circuitry (via the I/O pin 622) the functional circuitry 650 uses the access request signal 642 to notify the control system 640 of the requirement for access to the external circuitry. The access request signal 642 may be a single signal or may be multiple signals to communicate levels of requirement; the functional circuitry 650 may be required to wait for the impedance measurement process to complete or may be allowed to interrupt the sensor process depending on the importance of the access or level of interrupt.

If the functional circuitry 650 requests access to the I/O pin 622 and is able to wait for completion of impedance measurements, the control system 640 monitors the tamper feedback 620 signals to determine the completion of the impedance measure and the suitability of the external circuits for interfacing. That is, if the sensor 610 detects impedance out of acceptable ranges (thus indicating that the external signals may be probed) the control system 640 inhibits the functional circuitry 650 from operating and reports the sensor 610 detection back to the central system via the system interface 644. If the sensor 610 reports the external circuit operating within acceptable limits, the control system 640 (1) disables the sensor 610 using the sensor enable 634 signal, (2) enables input signals using the input enable signal 636 (if input is required), and (3) grants the functional circuitry 650 access to the I/O pin 622 by invoking the function enable signal 638. Once the function enable signal 638 is activated, the functional circuitry 650 has access to the I/O pin 622 via signals 632 and 630 (which are shown as signals of the operational input functions 512 and 514 respectively in FIGS. 8 and 9) which will properly rout through the input gate, function multiplexer, and tri-state buffer devices as shown with reference to FIGS. 8 and 9.

The tri-state control signal 646 (shown as 506 in FIGS. 8 and 9) is driven by the control system 640 in coordination with the functional circuitry 650. If the sensor 610 is active, the control system 640 ensures that the tri-state buffer is enabled. If the functional circuitry 650 is active, the control system 640 uses the tri-state control 646 to enable the tri-state buffer according to the input or output requirements of the functional circuitry 650.

The functional circuitry may require access to multiple I/O pins for functions such as memory interfaces and communication interfaces. FIG. 11 illustrates a system in which the functional circuitry 750 interfaces numerous I/O pins 722, each I/O pin 722 has its own sensor 710. In FIG. 11, integrated circuit 700 contains circuitry which includes some functional circuitry 750, a number of tamper detection sensors 710, related I/O pins 722, and a control system 740. As in FIG. 10, the control system 740 coordinates access to the I/O pins 722 through the sensor 710. The enable signal bus 742 for the sensor 710 includes all the control signals for each individual sensor 710 grouped into a single entity for clarity. The enable signal bus 742 includes input enable signals (such as disclosed with reference to element 636 in FIG. 10), sensor enable signals (such as disclosed with reference to element 634 in FIG. 10), and tri-state control signals (such as disclosed with reference to element 646 in FIG. 10). These signals may be combined in some instances. For instance, sixteen tri-state enable signals may be combined into one signal for a sixteen-bit memory data bus. In some instances, the enable signals may provide control for an individual sensor as will be described shortly.

As with the single sensor example as discussed above with regard to the prior embodiment, the functional circuitry of the sensor 710 communicates a requirement for I/O pin 722 access to the control system 740 by invoking access request signals 746 to indicate the level of need. The control system 740 may grant access to the I/O pins 722 by interrupting the processing of the sensors 710 or by allowing the sensors 710 to complete sensing operations. When the access to the I/O pins 722 is granted, the control system 740 indicates by appropriate signals on the function enable signal 744. As previously discussed, the control system 740 may prohibit access to the I/O pins 722 based on information gathered by the sensors 710.

In the multiple I/O pin systems as discussed herein with reference to FIG. 11, the sensors 710 must be controlled with consideration of the operation of other sensors 710. Because the sensors 710 test circuit impedance using a resonant frequency, oscillating circuits can have an effect on each other.

Because of electromagnetic effects, an oscillating circuit can create a sympathetic oscillation in a neighboring circuit. This sympathetic vibration may be measured or may be ignored. A circuit that is excited as previously described in order to oscillate at a resonant frequency will exhibit a different resonant frequency if a closely parallel circuit is simultaneously excited. The control system 740 must either (1) provide for the operation of only one sensor 710 at a time, (2) provide for simultaneous operation of only circuits that are sufficiently separated to minimize sympathetic vibration, or (3) control the sensor 710 so that different oscillation limits are used when circuits are excited simultaneously.

The control system 740 may also receive data for programming into limit registers via the system interface 738, may receive instructions pertaining to the operation of the sensors 710 and functional circuitry via the system interface 738, or may report details and results of the sensor 710 operation and system health back to the central system via the system interface 738.

The external devices 702 that are accessed by the functional circuitry 750 may be single or multiple integrated circuits or discrete electronic components.

The following discussion presents a preferred methodology for implementation of the tamper detection sensor described above in accordance with the various embodiments disclosed herein. The ring oscillator employed by the sensor requires a change in impedance in order to detect a tamper attempt. To understand how the impedance changes it is important to understand the impedance characteristics of printed circuit traces and by extension, printed circuit circuits.

A modern printed circuit board (PCB) usually contains a ground plane. A ground plane is a solid layer of copper conductor used to provide low impedance ground connection to all the components mounted on the PCB. Other layers of the PCB include traces which are conductive paths made of copper. These traces are parallel to a ground plane and form a capacitive element in reference to the ground plane due to (1) the surface area of conductive material of the ground plane, (2) the surface area of conductive material in the circuit trace, (3) the distance between the conductive members, and (4) the dielectric properties of the material between the conductive elements.

FIG. 12 illustrates the comparison of a simple capacitor to a PCB trace. In FIG. 12, two structures are shown; a capacitor 870 and a printed circuit board 860. The capacitor 870 is composed of an upper conductive layer 872, an insulating material 874, and a lower conductive layer 878. The capacitor's conductive layers are often referred to as plates by those skilled in the art. The capacitance of capacitor 870 is the surface area of the plates (so that Area A=X×Y) times the dielectric constant of material 874 (f) divided by the distance between the plates (distance d=Z). So the capacitance of capacitor 870 is µA/d.

Similarly the conductive component (or trace) 866 of printed circuit board 860 has a capacitance which is made up of a number of components, the principal component being µA/d where: distance d=Z' the distance between the two PCB layers, dielectric value µ=the dielectric of material 862, and area A=the area of the conductive component (trace) 866. Additionally, trace 866 has added capacitance from the effect of the edges of the trace and their relationship to the remainder of the surface are of the conductive layer 864 not directly below trace 866. This component must be calculated using integral calculus as the distance from the plane of the conductive layer 864 to trace 866 is different for each point on the plane of the conductive layer 864. The magnitude of each element of the capacitance of trace 866 need not be calculated, rather the present disclosure is provided to illustrate the various components and their impact on the operation of the tamper detection sensor 810 described herein. Further, there is a capacitance between trace 880 and trace 866 as well as between trace 880 and the plane of the conductive layer 864.

The materials used to insulate PCB layers are well characterized in reference to their dielectric characteristics. PCB inner layer spacing is sufficiently well controlled that capacitors may be effectively constructed from PCBs or as a part of a PCB. Similarly inductors can be formed on PCBs.

Trace 866 also exhibits an inductance based on its length and path as well as a resistance based on the copper thickness (referred to as copper weight in the PCB industry) the trace width, and the trace length. Each of these components of trace 866 (that is; capacitive, inductive, and resistive) combine to produce a complete RLC circuit composed of only one circuit trace. Any integrated circuits or other components connected to the trace add to the complexity of the resulting RLC circuit.

FIG. 13 shows a PCB 900 made up of routing layer 910, insulating spacing 920 and conductive plane 930. The conductive plane 930 is the ground plane for the PCB 900 and is also referred to as the ground or reference layer. The integrated circuit 915 is attached to the PCB 900 and is conductively connected to traces 940, 942, and 944. Conductive trace 944 connects through the insulation spacing 920 to the ground plane 930 so that all signals driven through the integrated circuit 915 are driven in reference to ground plane 930. The PCB 900 includes power sources and possibly power planes, integrated circuits, and other components not shown in FIG. 13.

The integrated circuit 915 applies the previously described sensor circuit to trace 940. The sensor circuit produces an impedance value based primarily on (1) the relationship of trace 940 to the ground plane 930, (2) the inductance of trace 940 due to its length and path, (3) the resistance of trace 940 due to its length and physical characteristics (thickness and width), and the impedance of component 950. Component 950 may be any passive or active electronic device, group of devices, or integrated circuit. To a lesser extent, the relationship of trace 940 to trace 942 contributes to the characteristic impedance of trace 940. The contribution of trace 942 to the impedance of trace 940 is based on the proximity of the two traces and their lengths in proximity to each other.

The integrated circuit 915 in FIG. 13 measures the characteristic impedance of traces 940 and 942 using the previously described sensor techniques and determines that the PCB is operating under acceptable conditions.

In FIG. 14, other components have been added to the PCB. Wire 925 is electrically attached to circuit trace 940 and extends past the edge of the PCB to some form of test instrument. Wire 925 changes the impedance of circuit trace 940 by (1) adding more surface area to create a larger capacitance in relationship to the ground plane 930 and (2) adding length and therefore inductance to circuit trace 940. This additional capacitance is not related to the grounding of the test equipment but is a function of the physical characteristics of wire 925 (length, conductive surface area, dielectric of insulation). Wire 925 may also be detected by the sensor circuit related to circuit trace 942. Since Wire 925 is relatively close and parallel to trace 925 for a portion of its length, a capacitive effect is imparted on trace 942 by wire 925 and since wire 925 is electrically connected to trace 940, the relationship between circuit trace 940 and circuit trace 942 is altered.

Object 934 is some physical device held close to the PCB. If object 934 is an insulator, there will be a change in the capacitive component of the characteristic impedance of circuit trace 940. This change in capacitance is due to the change in composite dielectric of the free space surrounding circuit trace 940. This change in the free space dielectric affects the capacitance of trace 940 in respect to the ground plane due to the fact that the entire ground plane has a capacitive effect on trace 940 as explained in reference to FIG. 12. Further, the capacitive relationship between trace 940 and trace 942 is changed due to the change in dielectric between the traces.

If object 934 is conductive, a change in both capacitance and inductance is possible. The additional metal behaves as an additional capacitor plate creating the effect of two capacitors in parallel. This can cause a decrease in the capacitive component of the trace impedance. A metal object will also change the inductance of the trace by having the effect of a ferrite on the trace. Iron is not the only material that exhibits a ferrite effect on inductors. Biological materials such as a human hand or finger have been shown to have measurable effect on the circuit traces as well as wires, measurement probes, fluids, and objects of various compositions.

Object 938 is a planar structure perpendicular to the edge of the PCB. Because circuit trace 940 is relatively close to the edge of the PCB, the impedance of circuit trace 940 is affected by object 938. The material that object 938 is composed of will have an effect on the change in impedance, but, as discussed earlier, any material, conductor or insulator, will have an effect on the impedance of circuit trace 940.

Detecting a foreign object with various alignments and positioning in reference to the PCB allows for detection of changes in package or enclosure condition. A PCB can be designed with traces positioned to optimize the effect of enclosure components on the trace impedance. This can be used to detect that an enclosure has been opened or dismantled (without a switch or discrete sensor) or that an enclosure has been damaged, cut, or drilled (due to change in total mass and surface area of the enclosure).

Circuit traces may also be designed to detect items in parallel to the PCB. A large IC installed on one PCB can be detected on a neighboring PCB to indicate that the appropriate PCBs have been installed together in an assembly. Objects such as heat sinks can also be detected.

While the preferred embodiments have been shown and described, it will be understood that there is no intent to limit the invention by such disclosure, but rather, is intended to cover all modifications and alternate constructions falling within the spirit and scope of the invention.

The invention claimed is:

1. A sensor system for protecting products and technology from reverse engineering by detecting attempts to probe electronic circuitry, comprising:
   an integrated circuit including an I/O pin, the integrated circuit being a programmable logic device including an impedance sensor and electronic circuitry in communication with the I/O pin, wherein the impedance sensor is completely integrated inside the integrated circuit and is implemented using the programmable logic device, the impedance sensor is electrically linked to the electronic circuitry, the impedance sensor detecting interaction of probe devices with the electronic circuitry for the purpose of reverse engineering the electronic circuitry;
   the impedance sensor includes:
      an exciter causing an oscillation that is a function of the exciter and impedance of the electronic circuitry, the exciter is completely integrated inside the integrated circuit and is implemented using the programmable logic device;
      an impedance counter linked to the exciter, a count rate of the impedance counter is a function of the impedance of the electronic circuitry due to the fact that oscillation frequency generated by the exciter is also a function of the impedance of the electronic circuitry;
      an impedance register storing the binary count value from the impedance counter, wherein after the impedance counter data is transferred into the impedance register, the data is referred to as impedance data;
      a reference oscillator monitoring count rate of the impedance counter; and
      a sensor evaluation system compares the impedance value to threshold values to determine if a significant change has occurred, and when changes have occurred this is indicative of abnormal behavior and may be indicative of tampering relating to the evaluation of the electronic circuit for the purpose of reverse engineering.

2. The sensor system according to claim 1, wherein the exciter is composed of an inverter with a predetermined delay to implement an oscillation function.

3. The sensor system according to claim 2, wherein the exciter is composed of a ring oscillator.

4. The sensor system according to claim 1, wherein the impedance sensor is implemented in PLD.

5. The sensor system according to claim 1, wherein the impedance sensor is implemented in ASIC.

6. The sensor system according to claim 1, wherein the impedance counter includes a binary counter.

7. The sensor system according to claim 1, further including a feedback signal linked to the exciter, the feedback signal is used to drive a clock input of a binary counter forming the impedance counter.

8. The sensor system according to claim 1, wherein the reference oscillator is composed of a quartz oscillator.

9. The sensor system according to claim 1, wherein the exciter is composed of multiple oscillator inverters, each of the oscillator inverters outputting an impedance frequency signal used as a clock for the impedance counter.

10. The sensor system according to claim 1, further including an AND gate to indicate a desired count value for enablement of the impedance counter and the impedance register.

11. The sensor system according to claim 1, wherein the sensor evaluation system employs threshold limits in determining tampering and the threshold limits are determined dynamically.

12. The sensor system according to claim 1, wherein the exciter is implemented using Look Up Tables.

13. The sensor system according to claim 1, wherein the electronic circuitry is in the form of a printed circuit board.

14. A sensor system for protecting products and technology from reverse engineering by detecting attempts to probe electronic circuitry, comprising:
   a sensor electrically linked to electronic circuitry, the sensor detecting interaction of probe devices with the electronic circuitry for the purpose of reverse engineering the electronic circuitry;
   the sensor includes:
      an exciter;
      an impedance counter linked to the exciter, a count rate of the impedance counter is a function of the impedance of the electronic circuitry due to the fact that oscillation frequency generated by the exciter is also a function of the impedance of the electronic circuitry;
      an impedance register storing the binary count value from the impedance counter, wherein after the impedance counter data is transferred into the impedance register, the data is referred to as impedance data;

a reference oscillator monitoring count rate of the impedance counter; and a sensor evaluation system compares the impedance value to threshold values to determine if a significant change has occurred, and when changes have occurred this is indicative of abnormal behavior and may be indicative of tampering relating to the evaluation of the electronic circuit for the purpose of reverse engineering; and wherein the reference oscillator includes an output that drives a reference counter measuring a specific interval of time for the purpose of monitoring count rate of the impedance counter.

15. The sensor system according to claim 14, wherein after the impedance counter data is transferred into the impedance register, the data is referred to as impedance data.

16. A sensor system for protecting products and technology from reverse engineering by detecting attempts to probe electronic circuitry, comprising:

a sensor electrically linked to electronic circuitry, the sensor detecting interaction of probe devices with the electronic circuitry for the purpose of reverse engineering the electronic circuitry;

the sensor includes:
an exciter;
an impedance counter linked to the exciter, a count rate of the impedance counter is a function of the impedance of the electronic circuitry due to the fact that oscillation frequency generated by the exciter is also a function of the impedance of the electronic circuitry;
an impedance register storing the binary count value from the impedance counter, wherein after the impedance counter data is transferred into the impedance register, the data is referred to as impedance data;
a reference oscillator monitoring count rate of the impedance counter; and
a sensor evaluation system compares the impedance value to threshold values to determine if a significant change has occurred, and when changes have occurred this is indicative of abnormal behavior and may be indicative of tampering relating to the evaluation of the electronic circuit for the purpose of reverse engineering; and
wherein the sensor evaluation system includes a first comparator and a second comparator, wherein the second comparator compares the impedance value with a threshold value stored in a low limit register, when the impedance value is below the low limit threshold value, an A <B output of the second comparator indicates that a change in impedance has been detected, and the impedance value is compared to a high limit threshold value stored in a register, and when the impedance value is greater than the high limit threshold value, the A <B output of the first comparator indicates that a change in impedance has been detected.

17. A sensor system for protecting products and technology from reverse engineering by detecting attempts to probe electronic circuitry, comprising:

a programmable logic device based integrated circuit including a dual use I/O pin, as well as an impedance sensor and electronic circuitry in communication with the dual use I/O pin, wherein the impedance sensor is completely integrated inside the integrated circuit and is implemented using the programmable logic device, the impedance sensor being linked to a dual use I/O pin, the impedance sensor detecting interaction of probe devices with the integrated circuit for the purpose of reverse engineering the integrated circuit;

the impedance sensor includes:
an exciter causing an oscillation that is a function of the exciter and impedance of the electronic circuitry, the exciter is completely integrated inside the integrated circuit and is implemented using the programmable logic device;
an impedance counter system linked to the exciter, a count rate of the impedance counter is a function of the impedance of the integrated circuit due to the fact that oscillation frequency generated by the exciter is also a function of the impedance of the integrated circuit;
a sensor evaluation system compares the impedance value to threshold values to determine if a significant change has occurred, and when changes have occurred this is indicative of abnormal behavior and may be indicative of tampering relating to the evaluation of the integrated circuit for the purpose of reverse engineering.

18. A sensor system for protecting products and technology from reverse engineering by detecting attempts to probe electronic circuitry, comprising:

a programmable logic based integrated circuit including a sensor linked to a dual use I/O pin, the sensor detecting interaction of probe devices with the integrated circuit for the purpose of reverse engineering the integrated circuit;

the sensor includes:
an exciter;
an impedance counter system linked to the exciter, a count rate of the impedance counter is a function of the impedance of the integrated circuit due to the fact that oscillation frequency generated by the exciter is also a function of the impedance of the integrated circuit;
a sensor evaluation system compares the impedance value to threshold values to determine if a significant change has occurred, and when changes have occurred this is indicative of abnormal behavior and may be indicative of tampering relating to the evaluation of the integrated circuit for the purpose of reverse engineering; and
wherein the sensor includes a tri-state buffer and a function multiplexer linked to the exciter and controlling enablement of the exciter providing external circuitry with control of the dual use I/O pin.

19. The sensor system according to claim 18, wherein the multiplexer is implemented using Look Up Tables and the exciter is implemented using Look Up Tables.

20. The sensor system according to claim 18, wherein the exciter, the function multiplexer, and the tri-state buffer are linked to define a ring oscillator.

21. The sensor system according to claim 20, wherein a sensor enable signal enables the exciter to oscillate when the function multiplexer is set to output an exciter function signal input transmitted from the exciter to the multiplexer.

22. A sensor system for protecting products and technology from reverse engineering by detecting attempts to probe electronic circuitry, comprising:

a sensor electrically linked to electronic circuitry, the sensor detecting interaction with the electronic circuitry;

the sensor includes:
a ring oscillator;
an impedance counter linked to the exciter, a count rate of the impedance counter is a function of the impedance of the electronic circuitry due to the fact that oscillation frequency generated by the exciter is also a function of the impedance of the electronic circuitry;

an impedance register storing the binary count value from the impedance counter, wherein after the impedance counter data is transferred into the impedance register, the data is referred to as impedance data;

a reference oscillator monitoring count rate of the impedance counter; and a sensor evaluation system compares the impedance value to threshold values to determine if a significant change has occurred, and when changes have occurred this is indicative of abnormal behavior and may be indicative of tampering relating to the evaluation of the electronic circuit for the purpose of reverse engineering;

a tri-state buffer; and a function multiplexer linked to the exciter and controlling enablement of the exciter.

23. A sensor system for protecting products and technology from reverse engineering by detecting attempts to probe electronic circuitry, comprising:

an integrated circuit formed upon a printed circuit board, the integrated circuit including a sensor electrically linked to electronic circuitry, the sensor detecting interaction with the electronic circuitry, wherein the integrated circuit is conductively connected to multiple circuit traces, the sensor measuring and monitoring characteristic impedace of the multiple circuit traces;

the sensor includes:

an exciter;

an impedance counter linked to the exciter, a count rate of the impedance counter is a function of the impedance of the electronic circuitry due to the fact that oscillation frequency generated by the exciter is also a function of the impedance of the electronic circuitry;

an impedance register storing the binary count value from the impedance counter, wherein after the impedance counter data is transferred into the impedance register, the data is referred to as impedance data;

a reference oscillator monitoring count rate of the impedance counter; and a sensor evaluation system compares the impedance value to threshold values to determine if a significant change has occurred, and when changes have occurred this is indicative of abnormal behavior and may be indicative of tampering relating to the evaluation of the electronic circuit for the purpose of reverse engineering.

24. The sensor system according to claim 23, wherein the multiple circuit traces include a first trace passing through an insulation spacing of the printed circuit board and to a ground plane of the printed circuit board.

25. The sensor system according to claim 24, wherein the multiple circuit traces include a second circuit trace connected between the integrated circuit and an electronic device.

26. The sensor system according to claim 25, wherein the multiple circuit traces include a third circuit trace adjacent the second circuit trace, and the proximity of the first circuit trace and the second circuit trace alter a characteristic impedance of the second circuit trace.

27. The sensor system according to claim 23, wherein the multiple circuit traces include a second circuit trace connected between the integrated circuit and an electronic device.

28. The sensor system according to claim 27, wherein the multiple traces include a third trace adjacent the second trace, and the proximity of the first trace and the second trace alter a characteristic impedance of the second trace.

* * * * *